UNITED STATES PATENT OFFICE.

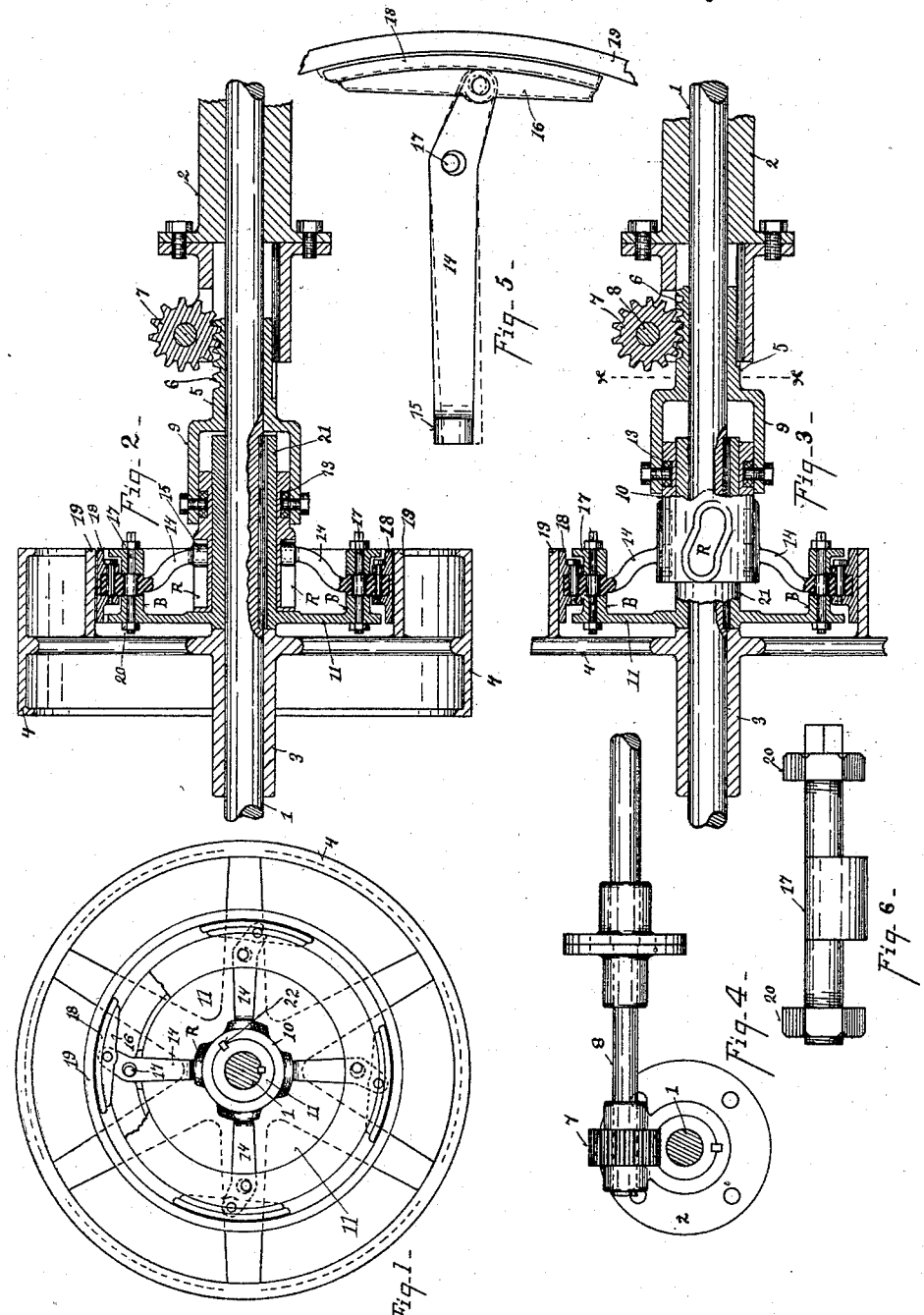

ALVA C. RICE, OF DAYTON, OHIO, ASSIGNOR TO THE STILWELL & BIERCE MANUFACTURING COMPANY, OF SAME PLACE.

FRICTION-CLUTCH.

SPECIFICATION forming part of Letters Patent No. 456,909, dated July 28, 1891.

Application filed December 29, 1890. Serial No. 376,109. (No model.)

*To all whom it may concern:*

Be it known that I, ALVA C. RICE, a citizen of the United States, and a resident of Dayton, in the county of Montgomery and State of Ohio, have invented certain new and useful Improvements in Friction-Clutches, of which the following is a specification.

My invention relates to a friction-clutch. It is shown as adapted to be used as a pulley; but it may also be employed as a coupling for connecting shafts, the features of which will be fully set forth in the description of the accompanying drawings, making a part of this specification, in which—

Figure 1 is a side elevation of my improvement. Fig. 2 is a transverse vertical section. Fig. 3 is a longitudinal section, partly in elevation, of the clutch mechanism. Fig. 4 is a sectional elevation on line $x\ x$, Fig. 3. Fig. 5 is a detail view of one of the shipping-arms. Fig. 6 is a plan view of the eccentric bolt.

1 represents the main driving-shaft, which journals in the bearing 2 and in the sleeves 3 of the transmitting-pulley 4.

5 represents a sleeve sliding on the shaft 1. It is provided with a series of rack-teeth 6, which engage with the teeth of spur-gear 7, mounted upon the shaft 8.

9 represents a socket or enlargement of the sleeves 5, which engages on the shipping-collar 10.

22 represents a feather for connecting said shipping-collar to the hub 21, so that it may move longitudinally on but revolve continuously with the shaft. The socket and sleeve are attached to the ring 13, which fits and journals in the annular groove chased in the periphery of said shipping-collar 10, so that said collar and sleeve may move longitudinally while the former is revolved or in motion.

21 represents the hub of the driving or friction pulley.

11 represents a radial disk projecting from the hub 21, and B represents bosses attached to said disk 11 and forming a base for supporting the clutch-arms 14, the ends of which are provided with a friction-roll 15. These rollers travel in inclined slots R pierced in the hub 10. Said arms are centered preferably upon eccentric bolts 17, which pass through the bosses B and are secured by nuts 20. To the outer end of said arms are pivoted friction-segments 18.

19 represents a frictional rim mounted on the arms of the transmitting-pulley 20, which is shown in Fig. 2 as being provided with the rim for receiving a bolt and transmitting power. When it is desired, however, to use this friction-clutch for the coupling of shafts, the rim and that portion of the pulley 4 outside the rim 19 may be omitted and the parts only used, as shown in Fig. 3, the dimensions of which may be reduced, if desired, when it is to be used only as shaft-coupling.

Mode of operation: When the clutch-segments 18 are desired to be brought in frictional contact with the rim 19, the gear 8 is turned so as to move the sleeve 5 forward, which by engaging the collar 10 moves it forward upon the hub 21. The lever-arms 14 are moved circumferentially by the inclined slots R, and being journaled upon the centers 17 serve as levers and force the segments 18 outward against the frictional rim 19. The eccentric bolt 17 is employed for adjusting the said lever-arms 14 out or in radially, so as to bring the different segments in the same plane to engage properly with the friction-rim 19. This form of construction makes a very strong friction-clutch, which can be readily operated under high or low speed and may be used equally well for a coupling of two shafts together, as well as for a coupling of pulleys to a shaft.

Having described my invention, what I claim is—

1. A clutch composed of the shipping-collar 10, sleeve 21 of the driving-ring 11, and the lever-arms 14, carrying segments 18 and seated in said collar 10 and adapted to engage with the said friction-rim, substantially as specified.

2. In combination with the driving-shaft 1, the transmitting-pulley 11, the shipping-collar 10, journaling thereon, provided with inclined slots R, and the lever-arm seated in and moved by said slots, journaling upon the centers 17, and armed with the frictional segments 18, whereby they are moved out and in by the shipping of said hub, substantially as described.

3. A friction-clutch composed, substantially, of the driving-pulley 11, provided with the hub 21, the shipping-collar 10, sliding thereon and provided with slots for moving the lever-arms 14, journaling on said centers 17, and swiveled to the sleeve 5, and mechanism for sliding said sleeve on the main shaft, substantially as specified.

4. In combination with a transmitting-pulley 4, provided with the friction-rim 19, in combination with the driving-pulley 11, the collar 10, and lever-arms 14, seated in slots R of said collar, journaling on centers 17, and pivoted to the segments 18, substantially as described.

5. In a friction-clutch, the shipping-collar 10, provided with inclined slots R, in combination with the lever-arms carrying bosses B, and the eccentric bolts 17 for adjusting said lever-arms radially, substantially as specified.

In testimony whereof I have hereunto set my hand.

ALVA C. RICE.

Witnesses:
GEO. R. YOUNG,
WM. SAINT.